United States Patent Office 3,527,261
Patented Sept. 8, 1970

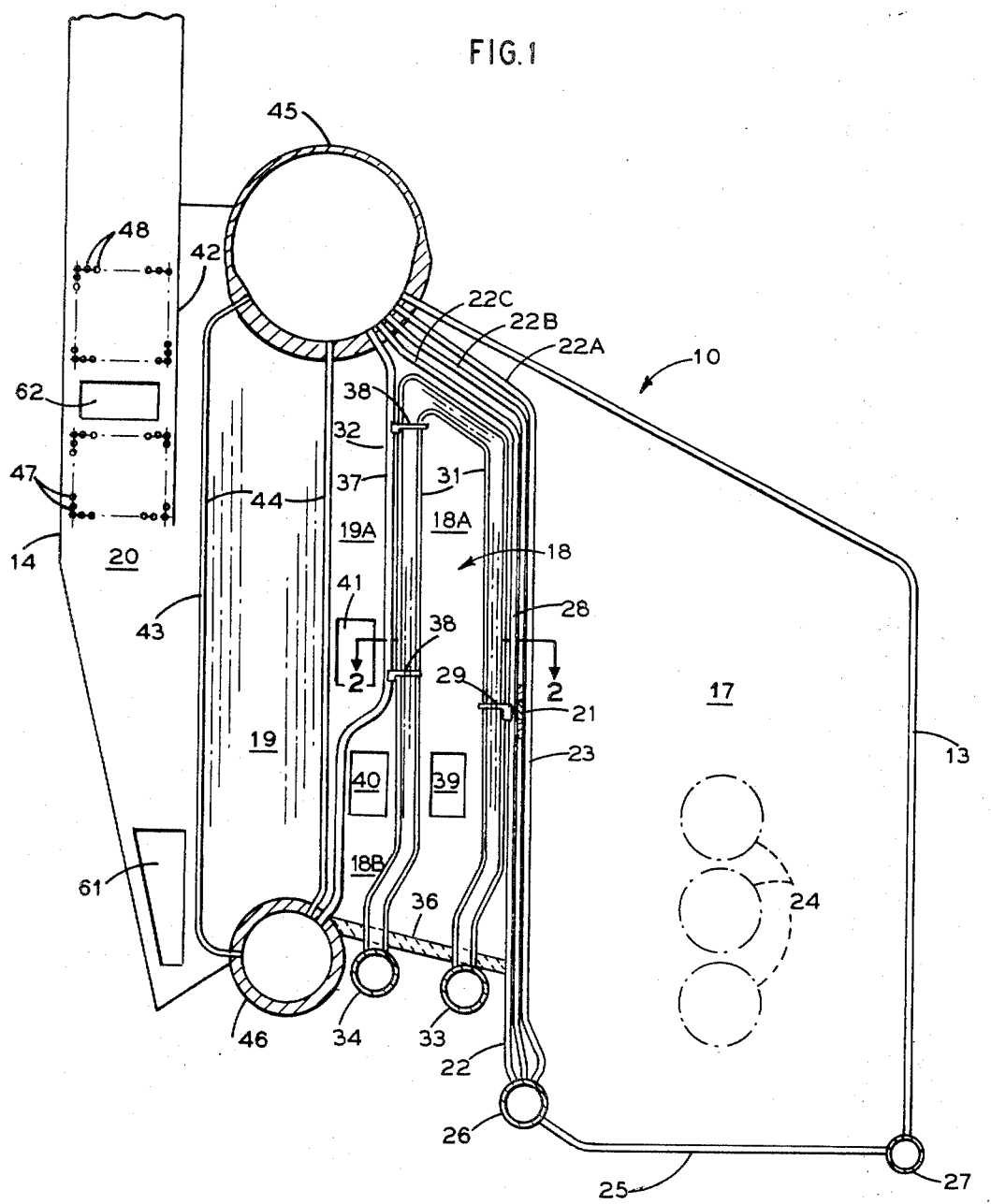

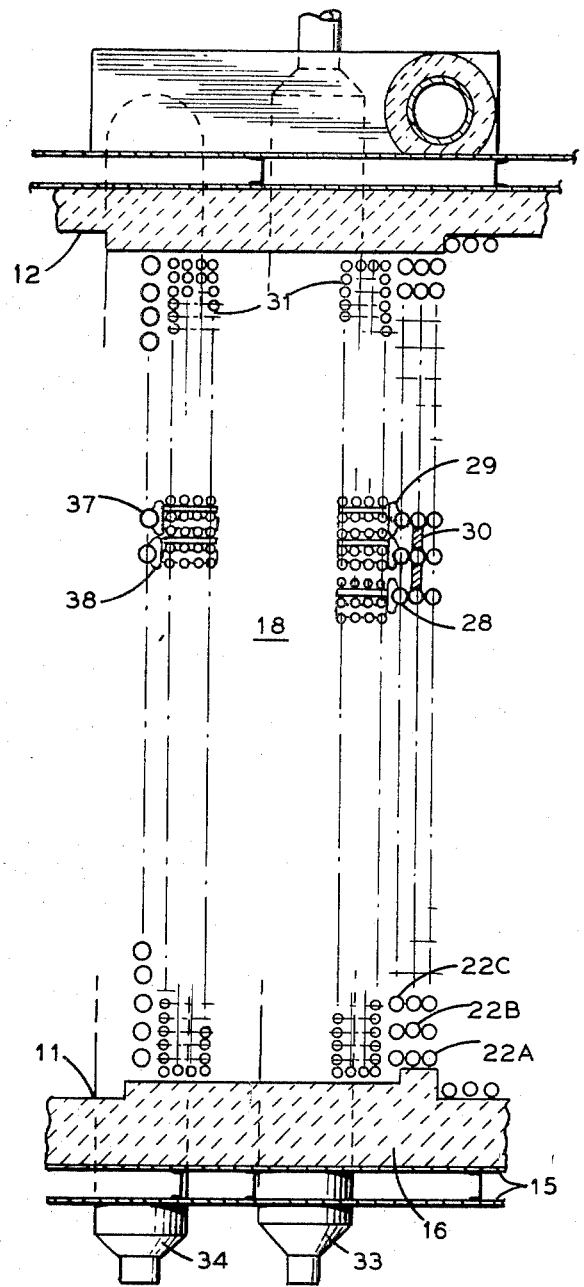

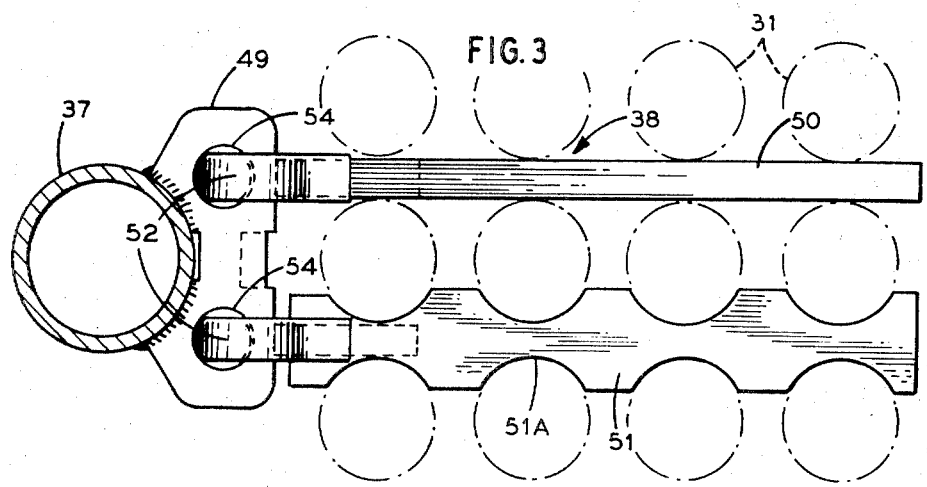
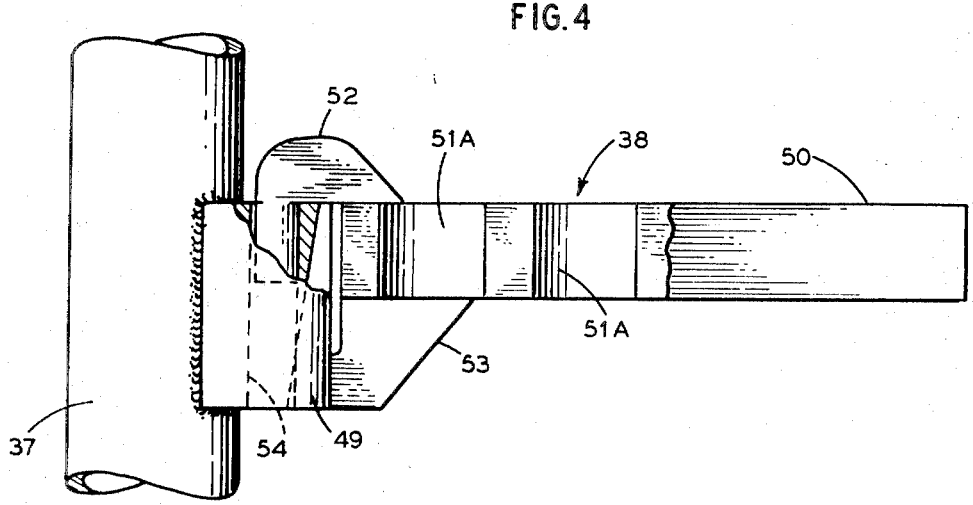

3,527,261
TUBE GUIDE APPARATUS
Bernhard Bigler, Rittaman, and Jules L. Louvet-Dronet, Barberton, Ohio, assignors to The Babcock & Wilcox Company, New York, N.Y., a corporation of New Jersey
Filed Nov. 12, 1968, Ser. No. 774,750
Int. Cl. F22b 37/24
U.S. Cl. 122—510                   10 Claims

ABSTRACT OF THE DISCLOSURE

A tube guide apparatus for maintaining the predetermined spacing between parallel rows of tubes of heat exchangers in a vapor generator, by restraining lateral movement of the tubes while permitting the longitudinal movement required for expansion. The apparatus comprises several individually detachable sections and is particularly well suited for use in hot, corrosive atmospheres where occasional guide replacement may be required. Replacement of the detachable sections is accomplished without affecting the tubes which support the tube guide apparatus.

---

The invention relates to a vapor generating unit and more particularly to a guide apparatus for maintaining a predetermined spacing between parallel rows of tubes in a tube bank.

Present day power plant requirements often call for a vapor generating unit which is of compact design, has a high heat release rate and is capable of burning the poorer grade fuels. These factors when coupled with a demand for maximum availability place considerable emphasis on the maintenance aspect of power plant operation. The trend toward compactness has raised maintenance costs by imposing restrictions on fireside accessibility, the higher heat release has made fireside components more susceptible to corrosive attack from the poorer grade fuels thereby increasing the frequency of maintenance, and the demand for maximum availability has placed a premium on the outage time allotted for maintenance. The fireside components associated with the vapor heating surfaces have been particularly vulnerable to corrosive attack by virtue of their exposure to high temperature gases. One such component is the guide system used to maintain a predetermined spacing between the parallel tube rows of a vertical superheater bank. This system comprises a multiplicity of tube guide apparatus, each of which have one end supportingly attached to a vapor generating tube and the other end extended in cantilever fashion between vertical rows of superheater tubes. During operation of the vapor generator, the flue gas temperature will be as high as 2200° F. entering the superheater and 1600° F. leaving the superheater with the tubes subjected to the cooling effect of the steam passing therethrough to keep the metal temperature within acceptable limits, which may be in the order of 1000° F. The vapor generating tubes being used to support the guide apparatus are passing relatively cooler saturated fluid which keeps their metal temperature at an average of 700° F. The guide apparatus, unlike the tubes, consists of solid castings which are without the benefit of internal cooling and the heat they absorb must be dissipated largely through their attachment to the vapor generating tubes by metal to metal contact. This method of cooling will sometimes prove insufficient to maintain the guide apparatus at reasonable metal temperature use limits and resultant temperature excesses will serve to hasten the guide metal wastage resulting from heat and attendant corrosion of the metal. The lack of accessibility due to the compactness of today's steam generators has made the replacement of this guide apparatus a costly and time consuming maintenance operation.

The present invention is directed to simplifying the repair and replacement of tube guide apparatus associated with the vapor heating surfaces of vapor generating units as well as the heating surface itself thereby effecting a reduction in the maintenance costs attendant thereto. The invention accomplishes this by providing a guide apparatus arrangement comprising a support section secured to a vapor generating tube and a plurality of detachable sections. The support section is designed to receive maximum cooling effect from the vapor generating tube and seldom if ever will require replacement. The detachable sections are accessible and readily replaceable without affecting the fixed support section or the associated vapor generating tube.

In one embodiment the arrangement includes a guide apparatus made up of three cooperating sections, two of which are individually detachable while the fixed third section, secured to one of the vapor generating tubes acts as the support member for the other two. The third section in accommodating the two detachable sections is of necessity a relatively thick and heavy piece of metal whose volume and area of exposure to the hot flue gas stream is considerably greater than its area of contact with the vapor generating tube. This relative inequality between the heat absorbing and cooling capabilities of the respective surface areas limits the use of the three-section guide apparatus to the cooler zones of the vapor generating unit, for example, the zones exposed to flue gas temperatures below 1600° F. A second embodiment includes three detachable sections with a fixed fourth section which is secured to one of the vapor generating tubes and serves as the support member. This fourth section is a relatively slender piece of metal whose volume and area of contact with the vapor generating tube provides a closer balance between the absorption and heat dissipation capabilities and makes it possible to use the four-section guide apparatus in the hotter zones of the vapor generating unit, for example, the zones exposed to flue gas temperatures in excess of 1600° F., without deleterious effect on its support member. A typical example illustrating the use of both guide apparatus arrangements would be a vapor generator equipped with a vertically arranged return-bend superheater. The tube legs located nearest to the furnace would be constrained by four-section guide apparatus with the support members secured to vapor generating tubes situated on the upstream side gas flow-wise of the superheater. The superheater tube legs located farthest from the furnace are guided by three-section guide apparatus whose support members are secured to vapor generating tubes situated downstream, gas flow-wise of the superheater. As an added measure of protection against the high temperature gases, refractory tile heat shields are provided ahead of the four-section guide apparatus.

In the drawings:

FIG. 1 is a sectional side view of a vapor generator, and superheater, in accordance with the present invention;

FIG. 2 is a fragmentary sectional plan view taken along line 2—2 of FIG. 1;

FIG. 3 is a plan view of the three-section guide apparatus;

FIG. 4 is a side view of FIG. 3;

Figure 5:
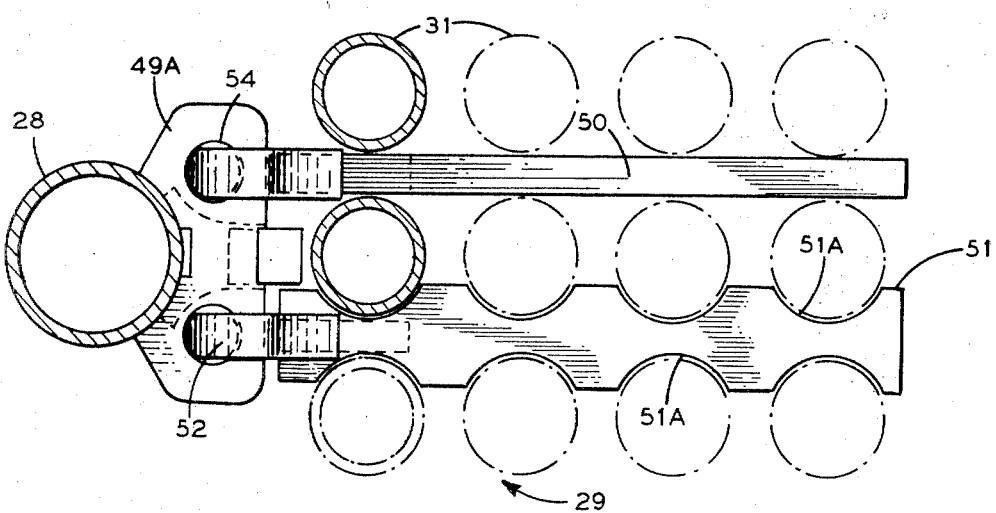
FIG. 5 is a plan view of the four-section guide apparatus.

Referring to FIGS. 1 and 2 there is shown a boiler setting 10 comprising front and rear walls 11 and 12 and furnace side wall 13 and boiler side wall 14. The boiler setting 10 is enclosed by casing 15 and a suitable insulating material 16. The setting 10 is partitioned into a furnace chamber 17, a superheater gas pass 18, a first convection gas pass 19, a second convection gas pass 20. Furnace chamber 17 is defined by furnace side wall 13 and sections of front and rear wall 11 and 12 and a screen 22. The water cooled walls enclosing the furnace are of conventional tubular construction while the furnace screen 22 forms the furnace gas outlet 23 to the horizontally extending superheater gas pass 18. The furnace portion of front wall 11 contains the openings 24 which accommodate the fuel burners (not shown). The furnace floor 25 connects furnace screen header 26 to side wall header 27. The furnace screen may comprise multiple in-line spaced upright tubes. The screen 22 as shown has three series of tubes, 22A, 22B and 22C. The tube series extend across the width of the gas pass with the tubes arranged in successive sequence, in the direction of gas flow, to form spaced rows of tubes. Series 22C includes support tubes 28 for supporting the four-section tube guide apparatus 29. Depending on the tube length and design requirements more than one guide apparatus may be associated with some or all of the support tubes. When necessary or desirable a shield may be used to protect the guide apparatus 29 from furnace heat radiation, the shield 21 may be formed by one or more layers of silicon carbide split tile 30 or any other suitable refractory material placed in the space between adjacent tube of series 22B, to close that portion of the row which is situated opposite and immediately upstream gas flow-wise of the guide apparatus 29. These tiles are supported by retaining lugs (not shown) welded directly to the furnace screen tubes in such manner as not to decrease the clearance between tube rows to facilitate renewal of superheater tube through the furnace screen 22.

The superheater gas pass 18, situated between the furnace screen 22 and the convection pass screen 32, contains the superheater heat exchange surface composed of upright, inverted, generally U-shaped tubes 31 spaced across the width of the gas pass. Tubes 31 are supported by the superheater headers 33 and 34 located below the gas pass refractory lined floor 36. The convection pass screen 32 is formed of a single series of in-line upright tubes, including the support tubes 37, which support the three-section tube guide apparatus 38. In cases where screen 32 comprises two or more series of tubes, the series nearest to the heat exchange surface to be guided will include the tubes for supporting the associated guide apparatus. Gas pass 18 is provided with cavities 18A, 18B and 19A to readily permit inspection and repair of the superheater tube guide apparatus 29 and 38 via access doors 39, 40 and 41.

First convection gas pass 19 is a vertically elongated pass disposed intermediate and laterally adjoining superheater gas pass 19 and second convection gas pass 20 and is defined by sections of front and rear walls 11 and 12, convection pass screen 32 and partition wall 42. First convection gas pass 19 includes vapor generating section 43 formed of in-line upright tubes 44 spaced across the width of gas pass 19 and connecting steam drum 45 with lower drum 46.

Second convection gas pass 20 is a vertically elongated gas pass located adjacent to and in communication with first convection gas pass 19, and is defined by partition wall 42, boiler side wall 14 and sections of front and rear walls 11 and 12. Second convection gas pass 20 includes an economizer 47 comprising sinuous tubes 48 horizontally disposed and extending across the width of the gas pass 20, and access doors 61 and 62.

FIGS. 3 and 4 are detail views of a three-section tube guide apparatus 38 showing the guide bar support lug 49 weldably secured to the support tube 37 and a first guide bar 50 and a second guide bar 51 formed with identical hooked ends 52 and lower lip extensions 53. The two guide bars differ in that the vertical sides of guide bar 50 are formed as flat surfaces while the vertical mating sides of guide bar 51 are scalloped as shown by arcuate portions 51A to accommodate tubes 31. The support lug 49 includes two circular openings 54, each being arranged to slidably engage the hooked end 52 of a respective guide bar. The guide apparatus 38 is a shown operatively associated with the superheater tubes 31.

Figure 6:
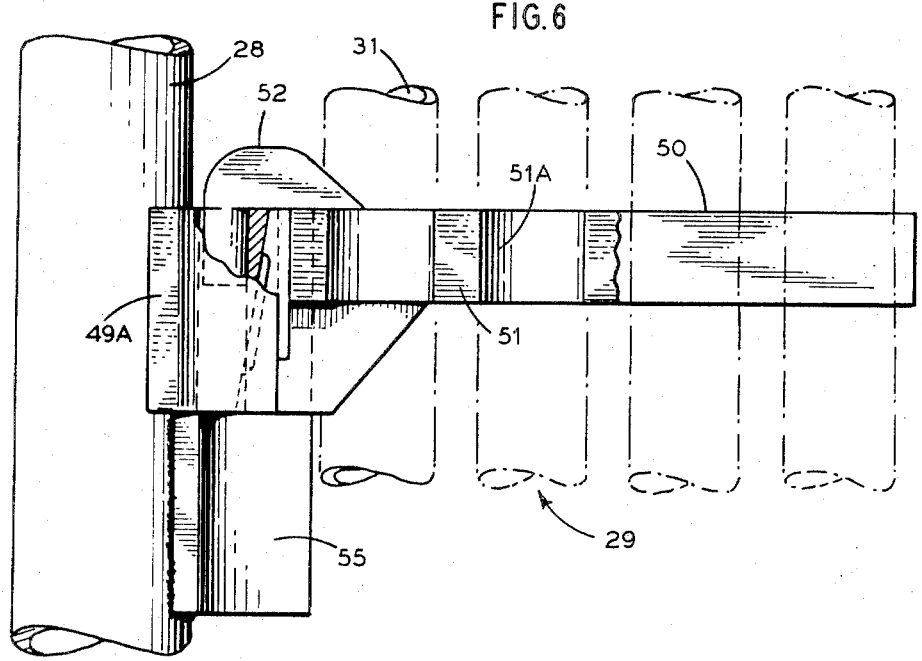
FIG. 6 is a side view of FIG. 5.

FIGS. 5 and 6 are detail views of the four-section tube guide apparatus 29 whichi ncludes components similar to the three-section apparatus 38 as identified in FIGS. 3 and 4 with the exception that the guide bar support lug 49A is not welded to support tube 28 and instead is slidably engaged with the support lug 55 which is weldably secured to support tube 28. Guide bars 50 and 51 are the same as in drawings 3 and 4. The guide apparatus 29 is shown operatively associated with the superheater tubes 31. In connection with FIG. 1, it will be noted that removal of the guide bars 50 and 51 and the guide bar support lug 49A will permit replacement of the superheater tubes 31 either from the side of furnace 17 or the side of cavity 18A.

Figure 7:
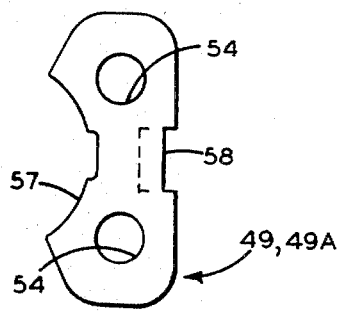
FIG. 7 is a plan view of the guide bar support lug.
Figure 8:
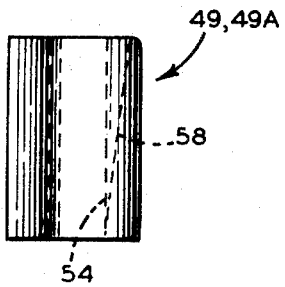
FIG. 8 is a side view of FIG. 7.
Figure 9:
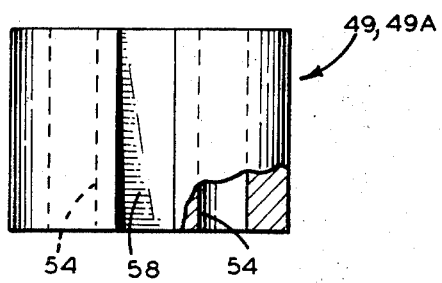
FIG. 9 is an end view of FIG. 7.

FIGS. 7, 8 and 9 are detailed views of the guide bar support lug 49, 49A showing the circular openings 54 extending through the entire height of the lug which serves to seat bars 50 and 51 and an arcuately recessed face 57 adapted to partially encompass the support tubes 28 and 37 and an opposite face formed with a bevelled rectangular slot 58 for seating lug 49A when the fixed support lug 55 is used with apparatus 29. Openings 54 are circular in cross section to prevent shearing of the guide bars should longitudinal loading occur.

Figure 10:
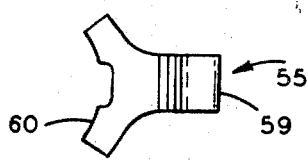
FIG. 10 is a plan view of the support lug.
Figure 11:
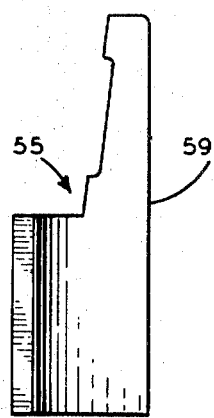
FIG. 11 is a side view of FIG. 10.
Figure 12:
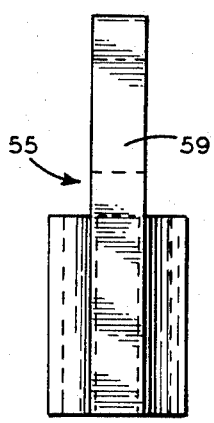
FIG. 12 is an end view of FIG. 10.

FIGS. 10, 11 and 12 are detailed views of the support lug 55 showing the finger portion 59 and an arcuately recessed lower face 60 adapted to partially encompass the support tube 28 to facilitate the lug 55 to the support tube.

In accordance with the invention, tubes 31 are arranged in inverted-U fashion and supported at the lower extremities by attachment to headers 33 and 34 which are located below the gas passage 18. This type of a support arrangement is particularly advantageous in that it keeps the structural supporting means out of the gas stream and therefore not exposed to warpage or wastage from heat and the corrosive elements present in the flue gas. This support arrangement, however, does present a problem as regards stability of the cantilevered ends of tubes 31. The unsupported ends will sway or oscillate and even assume a permanent list when subjected to the high gas velocities and thus cause an uneven distribution of flue gas across the superheater heat exchange surface with consequent danger of overheating the superheater tubes and slagging. This problem has been corrected by the tube guide apparatus here disclosed. The bars extending through the clear space between adjacent tube rows will inhibit the lateral movement of the tubes while still permitting their longitudinal movement. This latter consideration is necessary since the bottom supported tubes 31 will expand upwardly when heated. As a result of its location, the tube guide system is exposed to comparatively high gas temperatures and to the corrosive elements present in the flue gas and will require inspection, maintenance and occasional replacement. The present arrangement achieves an appreciable reduction in these servicing and replacement costs by having the guide apparatus made up of a number of separately detachable, relatively small lightweight members which can be easily replaced working from within the cavities 18A, 18B and 19A of gas passes 18 and 19. For example, a person would enter cavity 18A by way of access door 39 and if a visual inspection indicates the need for replacement of a part or parts, the guide bar 50 adjacent each side of scalloped guide bar 51 associated with the damaged guide apparatus is disengaged from the respective guide bar support lug 39 by lifting the hooked end 52 out of the opening 54 and sliding the guide bar 50 out from between the rows of tubes 31. The tubes 31 adjoining each side of the scalloped guide bar 51 may then be spread apart by the insertion of wedges or like means between the tubes and the scalloped guide bar 51 removed in the same manner as the guide bars 50. If the damaged tube guide apparatus is of the four-section type, then, while tubes 31 are spread apart the guide bar support 49 may be removed by lifting it from the support lug 55 and rotating it around the support tube 28 to a sidewise position and sliding it out from between the spread rows of tubes. Replacement with new sections is effected by following these steps in reverse order.

What is claimed is:

1. In combination with a boiler having a circulation system and a tube bank including parallel rows of tubes for receiving a flow of hot gases for heat transfer purposes, guide apparatus for the tube bank comprising, a plurality of upright support tubes connected into the circulation system, a guide bar support lug secured to one of the support tubes and having a pair of openings extending at least partially therethrough, a first guide bar having a guide section of rectangular cross-section extending transversely of the tubes of one row of the tube bank and contacting the tubes of said one row on one side thereof and an end section engaging one of said openings and one side of the guide bar support lug for support thereby, a second guide bar having a guide section extending transversely of said one row of tubes and scalloped along its length for engagement of the tubes of said said one row on the opposite side thereof and an end section engaging one of said openings and one side of the guide bar support lug for support thereby, the second guide bar cooperating with the first guide bar to inhibit lateral movement of the tubes of said row while permitting longitudinal movement thereof.

2. The combination according to claim 1 wherein there is included a support lug between said one tube and the guide bar support lug, the support lug being secured to said one tube and having a finger portion spaced from said one tube to provide a saddle therebetween, the guide bar support lug engaging the finger portion and being supported by the support lug.

3. The combination according to claim 1 wherein at least one guide apparatus is associated with each of the support tubes.

4. The combination according to claim 1 wherein the tube bank and the support tubes have their longitudinal axes extending in an upwardly direction.

5. The combination according to claim 3 wherein said longitudinal axes are substantially parallel to each other.

6. The combination according to claim 2 wherein the finger portion of the support lug extends upwardly and substantially parallel to said one support tube.

7. The combination according to claim 2 wherein the support lug has an arcuately recessed lower face adapted to partially encompass said one support tube.

8. The combination according to claim 1 wherein the guide bar support lug has an arcuately recessed face adapted to partially encompass said one support tube and an opposite face slotted to receive said finger portion.

9. The combination according to claim 1 wherein the first and second guides bars are each alternately positioned between parallel rows of the tube bank and said second guide bar is scalloped along opposite surfaces of its length for engagement with its adjacent rows of tubes.

10. The combination according to claim 2 wherein the support tubes are located upstream gas flow-wise of the tube bank and include at least one layer of tile in front of said guide apparatus.

References Cited

UNITED STATES PATENTS

| | | | |
|---|---|---|---|
| 2,884,911 | 5/1959 | Jankowski | 122—510 |
| 3,163,155 | 12/1964 | Culver | 122—510 |

KENNETH W. SPRAGUE, Primary Examiner